Patented Dec. 27, 1938

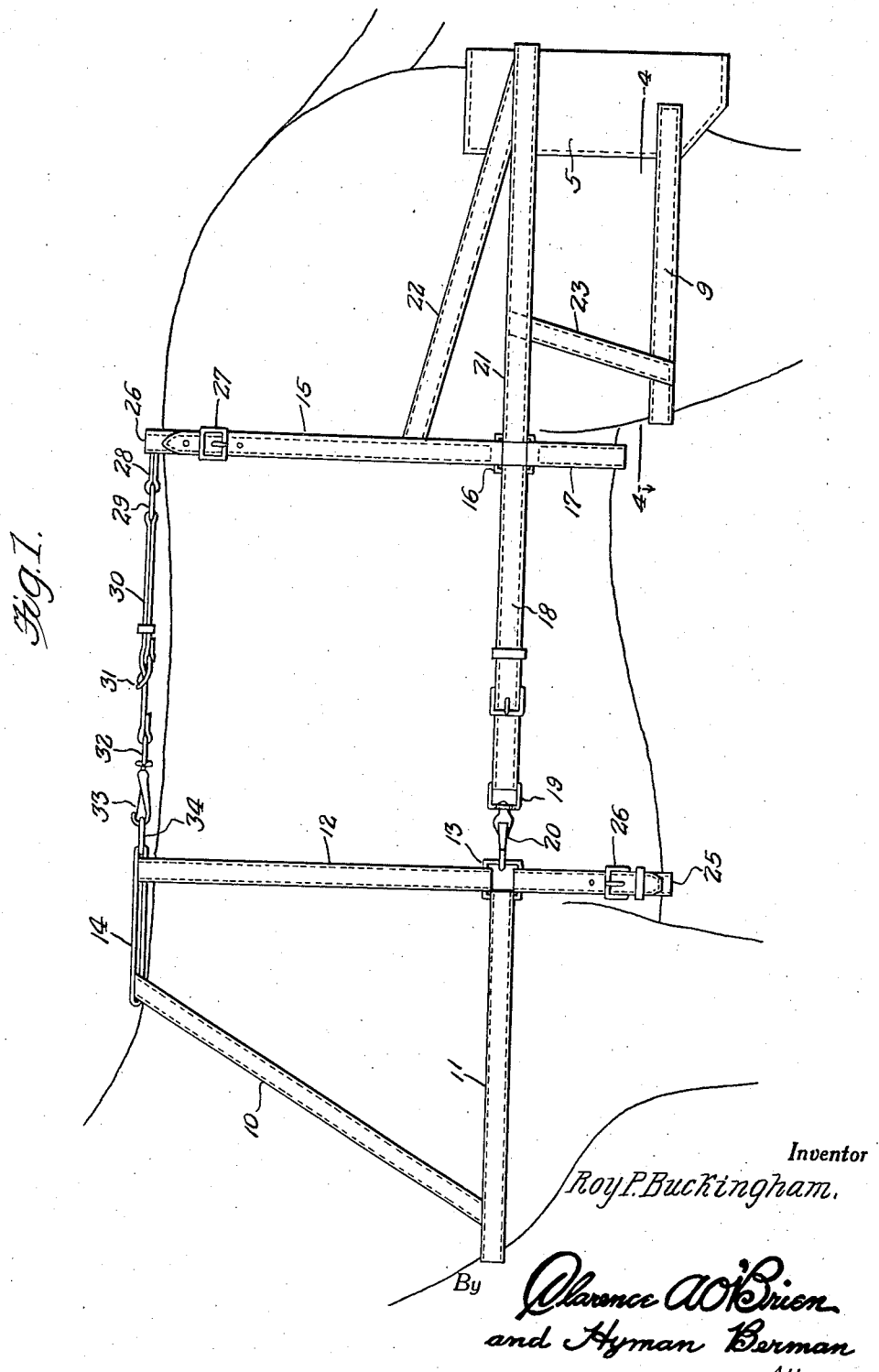

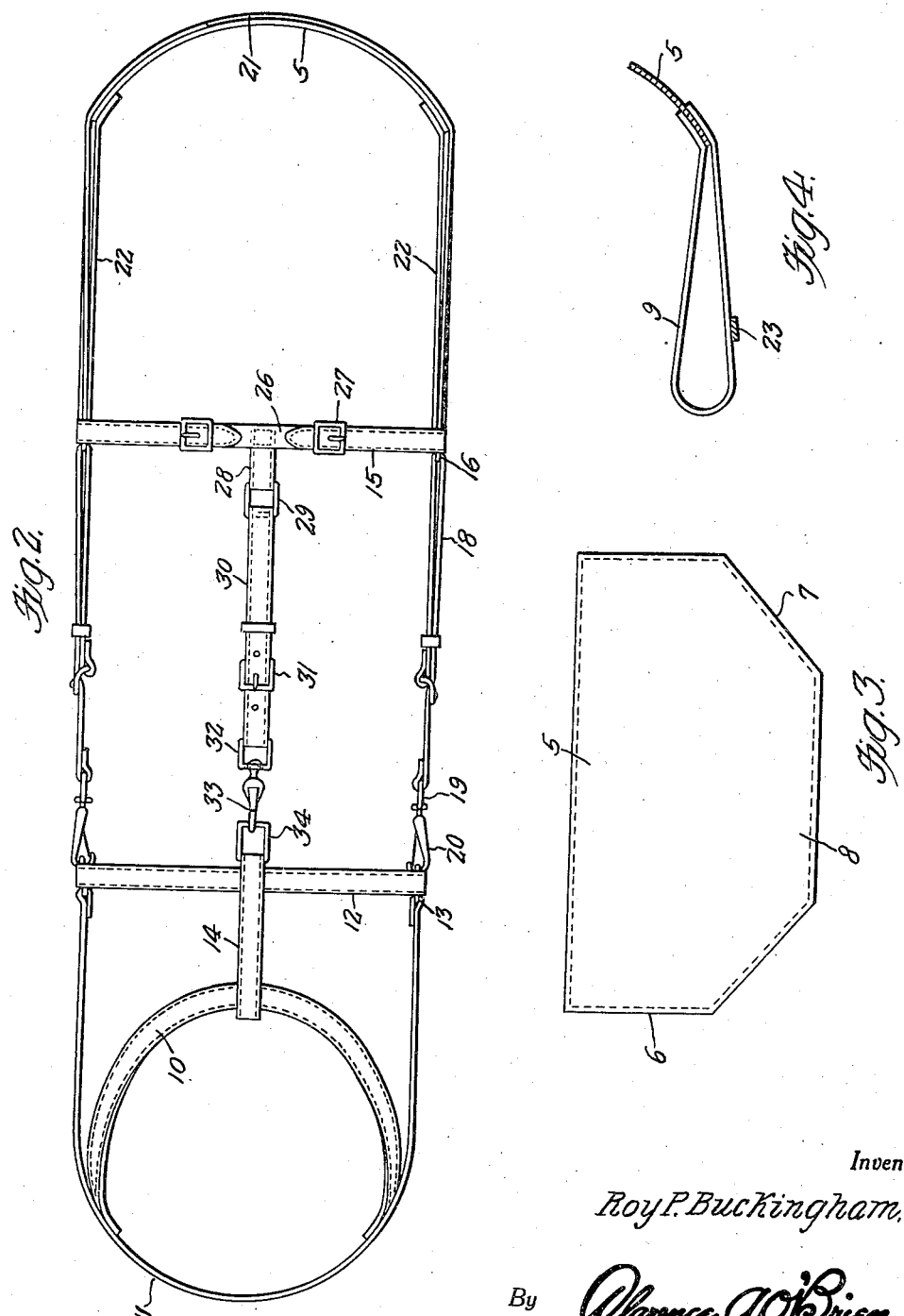

2,141,970

UNITED STATES PATENT OFFICE 2,141,970

COMBINATION SANITARY PAD AND SHIELD AND HARNESS THEREFOR

Roy P. Buckingham, Baldwin, Md., assignor of fifty per cent to George C. MacLarty, Baltimore, Md.

Application May 19, 1938, Serial No. 208,924

4 Claims. (Cl. 119—143)

This invention has reference to a combination pad and shield for application to animals and particularly female dogs for protecting the latter against the liability of unauthorized progeny, as well as to protect against damage by stains, garments or the like with which the animal may come in contact.

A further object of the invention is to provide an improved harness for supporting the shield.

The invention together with its objects and advantages will be best understood from a study of the following description taken in connection with the accompanying drawings wherein:—

Figure 1 is a side elevational view illustrating the application of the invention to an animal, Figure 2 is a top plan view of the invention, Figure 3 is an elevational view of the combination pad and shield, and Figure 4 is a detail sectional view taken substantially on the line 4—4 of Figure 1.

Referring to the drawings by reference numerals it will be seen that the pad indicated generally by the reference numeral 5 is formed from any suitable material cut, shaped and dimensioned to provide substantially a pad having an edge contour suggested in Figure 3, the side edges 6 of the pad for substantially the lower half of the pad being cut on a bias as at 7 so as to provide a lower end section 8 for the pad that is of materially less width than the upper portion of the pad.

The pad is adapted to be disposed across the buttocks of the animal when in operative position, as shown in Figure 1, and is provided at opposite ends thereof with leg-accommodating loops 9 which encircle the hind legs of the animal.

The leg encircling bands 9 form part of a harness which further includes a neck strap 10 adapted to be disposed across the back of the neck of the animal and said strap 10 is secured at its opposite ends to a breast band 11.

A shoulder band 12 is also provided and is connected at its opposite ends with the free ends of the breast band 11 through the medium of loops 13.

Bands 10 and 12 are trained through an endless back band or strap 14 as shown.

Girth straps 15 for disposition at opposite sides of the animal are connected at one end thereof through the medium of loops 16 with the main girth band 17 and side straps 18 which latter are adjustable as shown.

Side straps 18 are provided with loops 19 through the medium of which snap hooks 20 that engage the loops 13 are connected with the side straps 18.

Also connected with the loops 16 are the respective opposite ends of a rump strap 21 that extends across the rump of the animal with the upper portion of the pad 5 disposed between the rump of the animal and an intermediate portion of the band 21 as shown in Figure 1.

The rump band or strap 21 is also supported from the girth strap or band section 15 through the medium of diagonal straps 22 stitched or otherwise secured at one end thereof to the straps 15 and at an opposite end thereof to the rump strap 21.

The leg encircling bands 9 are also supported from the rump strap 21 through the medium of side strap sections 23.

An adjustable belly strap or band 25 is trained through the loops 13 and is adjustable through the medium of buckles 26.

Also the aforementioned sectional girth band in addition to embodying the sections 15 and 17 embodies a short section 27 that extends across the back of the animal and is adjustably connected with the girth band or strap sections through the medium of buckles 27.

The girth band section 26 has connected therewith through the medium of a short strap section 28 a loop 29 through which is trained an adjustable back strap section 30 that is adjustable through the medium of a buckle 31.

Connected to one end of the strap section 30 is a loop 32 through the medium of which is connected to said one end of the back strap 30 a snap hook 33 that engages a loop 34 carried by the back strap 14, it being apparent that through the medium of loop 32 and hook 33 strap sections 14 and 30 are detachably connected together.

It is thought that the method of applying the combination pad and shield and the supporting harness therefor will be clearly apparent by reference to the above description taken in connection with the accompanying drawings. It will also be apparent that in actual practice the harness may be readily applied in a manner to prevent its becoming detached and in a manner to maintain properly located the shield 5.

Having thus described the invention what is claimed as new is:—

1. In combination, a combination protective shield and pad for disposition across the buttocks of an animal and a harness connected therewith for securing and supporting the combination pad and shield in position on the animal, said harness including leg-accommodating loops extending from opposite ends of the combination shield and pad for accommodating the hind legs of the animal, side straps having rear portions connected with the pad and short straps connecting the side straps with the forward portions of the leg loops.

2. In combination, a combination protective shield and pad for disposition across the buttocks of an animal and a harness connected therewith for securing and supporting the combination pad and shield in position on the animal, said harness including leg-accommodating loops extending from opposite ends of the combination shield and pad for accommodating the hind legs of the animal, a neck band and a breast band, said neck band being secured at its opposite ends to the breast band, a shoulder strap connected at its opposite ends with the breast band, loops connecting the ends of the shoulder strap with the breast band, and an adjustable belly band trained through said loops, a girth band, side bands adjustably connecting the girth band with the aforementioned band-connecting loops, a rump band having a portion thereof disposed against the outer side of the combination shield and pad and means connecting the rump band with the girth and also with said side bands.

3. In combination, a combination protective shield and pad for disposition across the buttocks of an animal and a harness connected therewith for securing and supporting the combination pad and shield in position on the animal, said harness including leg-accommodating loops extending from opposite ends of the combination shield and pad for accommodating the hind legs of the animal, a neck band and a breast band, said neck band being secured at its opposite ends to the breast band, a shoulder strap connected at its opposite ends with the breast band, loops connecting the ends of the shoulder strap with the breast band, and an adjustable belly band trained through said loops, a girth band, side bands adjustably connecting the girth band with the aforementioned band-connecting loops, a rump band having a portion thereof disposed against the outer side of the combination shield and pad and means connecting the rump band with the girth and also with said side bands, a back strap section in the form of a continuous loop through which the neck and shoulder bands are trained, a back strap connected at one end with the girth, said back strap being adjustable, and means detachably connecting one end of the back strap with the aforementioned back strap of loop formation.

4. In combination, a combination protective shield and pad for disposition across the buttocks of an animal and a harness connected therewith for securing and supporting the combination pad and shield in position on the animal, said harness including leg-accommodating loops extending from opposite ends of the combination shield and pad for accommodating the hind legs of the animal, a neck band and a breast band, said neck band being secured at its opposite ends to the breast band, a shoulder strap connected at its opposite ends with the breast band, loops connecting the ends of the shoulder strap with the breast band, and an adjustable belly band trained through said loops, a girth band, side bands adjustably connecting the girth band with the aforementioned band-connecting loops, a rump band having a portion thereof disposed against the outer side of the pad, means connecting the rump band with the girth and also with said side bands, a back strap section in the form of a continuous loop through which the neck and shoulder bands are trained, a back strap connected at one end with the girth, said back strap being adjustable, and means detachably connecting one end of the back strap with the aforementioned back strap of loop formation, oppositely disposed diagonal strap sections connected at one end with the girth and at an opposite end to the rump band, and strap sections supporting the leg-encircling bands from the rump strap.

ROY P. BUCKINGHAM.